United States Patent
Banerjee et al.

(10) Patent No.: US 8,856,545 B2
(45) Date of Patent: Oct. 7, 2014

(54) SECURITY LEVEL DETERMINATION OF WEBSITES

(75) Inventors: Anirban Banerjee, Pasadena, CA (US); Michalis Faloutsos, Riverside, CA (US)

(73) Assignee: Stopthehacker Inc., Burlingame, CA (US)

( * ) Notice: Subject to any disclaimer, the term of this patent is extended or adjusted under 35 U.S.C. 154(b) by 102 days.

(21) Appl. No.: 13/183,142

(22) Filed: Jul. 14, 2011

(65) Prior Publication Data

US 2012/0017281 A1    Jan. 19, 2012

Related U.S. Application Data

(60) Provisional application No. 61/364,400, filed on Jul. 15, 2010.

(51) Int. Cl.
| | | |
|---|---|---|
| G06F 11/30 | (2006.01) | |
| G06F 11/00 | (2006.01) | |
| G06F 21/00 | (2013.01) | |
| G06F 12/14 | (2006.01) | |
| G08B 23/00 | (2006.01) | |

(52) U.S. Cl.
CPC ..................................... *G06F 21/00* (2013.01)
USPC ................................ 713/188; 726/25; 726/22

(58) Field of Classification Search
USPC .......... 713/168–174, 182–186, 202; 709/225, 709/229; 726/2–8
See application file for complete search history.

(56) References Cited

U.S. PATENT DOCUMENTS

| | | | |
|---|---|---|---|
| 7,562,304 B2 | 7/2009 | Dixon et al. | |
| 2007/0078849 A1* | 4/2007 | Slothouber | 707/5 |
| 2007/0276712 A1* | 11/2007 | Kolanchery et al. | 705/7 |
| 2012/0084283 A1* | 4/2012 | Chitiveli et al. | 707/728 |

OTHER PUBLICATIONS

Cisco (IronPort Web Reputation Filters, year 2008).*
Klanke (Why Blacklist Destationations, http://aggressivevirusdefense.wordpress.com/2009/04/19/why-blacklist/, printed out in year 2012).*
TrendMicro (Investigations on a Cybercrime Hub in Estonia | Malware Blog | Trend Micro, Feike Hacquebord, dated Aug. 26, 2009, printed out in year 2012).*

* cited by examiner

*Primary Examiner* — Evans Desrosiers

(57) ABSTRACT

A site analysis system to determine a security level of a website comprises a communication transceiver and a processing system. The communication transceiver is configured to receive content information associated with the website describing a current state of the website, receive historical event information associated with the website, and receive external information associated with the website from a source external to the website. The processing system is configured to process the content information to determine a content score for the website, process the historical event information and the external information to determine a reputational score for the website, and process the content score and the reputational score to generate a final score for the website.

21 Claims, 6 Drawing Sheets

GRAPHICAL USER INTERFACE 401

USER-CUSTOMIZABLE SECURITY LEVEL DETERMINATION

| MODULE | ATTRIBUTE | INCLUDE IN ANALYSIS? | WEIGHT |
|---|---|---|---|
| CONTENT ANALYSIS MODULE | SERVER CHARACTERISTICS | YES | 5 |
| | PROGRAM LANGUAGES | YES | 4 |
| | SERVICE SITE PROVIDES | YES | 6 |
| REPUTATIONAL ANALYSIS MODULE | SECURITY ATTACKS | YES | 9 |
| | BLACKLISTS | YES | 9 |
| | REPUTATIONAL RANK | YES | 7 |
| | HISTORICAL CHANGES | YES | 6 |
| PREDICTIVE MODULE | TRENDS FOR SIMILAR SITE TYPES | YES | 7 |
| | CUSTOMER PROFILE | YES | 6 |
| | TRAFFIC PROFILE | YES | 6 |
| BUSINESS PRACTICES MODULE | CODE MAINTENANCE | YES | 3 |
| | SERVER MAINTENANCE | NO | 0 |

FIGURE 4

SECURITY LEVEL DETERMINATION OF WEBSITES

RELATED APPLICATIONS

This application is related to and claims priority to U.S. Provisional Patent Application No. 61/364,400, entitled "Security Level Determination of Web Sites Using Numeric and Visual Identifiers" filed on Jul. 15, 2010, and which is hereby incorporated by reference in its entirety.

TECHNICAL BACKGROUND

The use of communication networks to send and receive information has become increasingly prominent. For example, individuals and businesses frequently access websites to conduct business transactions, transfer information, share ideas, experience entertainment media, and utilize other services. However, as a result of the increased use of communication networks, websites have also become increasingly vulnerable to attacks by malicious individuals and/or software applications.

The security of a website is of great importance to those who operate, host, insure, or are otherwise involved in the provision of a website. In addition, users who access the website often demand assurance that the website is safe, secure, and will not harm the user's computer system. Unfortunately, despite security precautions, a website could still be subject to intrusions by computer hackers, malware, viruses, and other malicious attacks. Such attacks can harm the reputation of the website, which can result in decreased traffic to the site and negatively impact the goals of the website operator.

OVERVIEW

A method of operating a site analysis system to determine a security level of a website is disclosed. The method comprises receiving content information associated with the website describing a current state of the website, receiving historical event information associated with the website, and receiving external information associated with the website from a source external to the website. The method further comprises processing the content information to determine a content score for the website, processing the historical event information and the external information to determine a reputational score for the website, and processing the content score and the reputational score to generate a final score for the website.

A site analysis system to determine a security level of a website comprises a communication transceiver and a processing system. The communication transceiver is configured to receive content information associated with the website describing a current state of the website, receive historical event information associated with the website, and receive external information associated with the website from a source external to the website. The processing system is configured to process the content information to determine a content score for the website, process the historical event information and the external information to determine a reputational score for the website, and process the content score and the reputational score to generate a final score for the website.

A computer-readable medium having program instructions stored thereon for operating a site analysis system is disclosed. The computer-readable medium comprises a content analysis software module configured to direct the site analysis system to receive content information associated with the website describing a current state of the website and process the content information to determine a content score for the website. The computer-readable medium further comprises a reputational software module configured to direct the site analysis system to receive historical event information associated with the website, receive external information associated with the website from a source external to the website, and process the historical event information and the external information to determine a reputational score for the website. The computer-readable medium further comprises a score determination software module configured to direct the site analysis system to process the content score and the reputational score to generate a final score for the website.

The system can be used as an advisory evaluation tool with multiple uses, including without limitation:
  (a) to evaluate the security level of a single website;
  (b) to evaluate the security level of a group of websites;
  (c) to provide a comparison and/or a ranking of the websites with respect to each other or to some external reference point (such as the industry standard expectation); and
  (d) to evaluate trends on the security level of one or more websites over time.

BRIEF DESCRIPTION OF THE DRAWINGS

FIG. 4 is a block diagram that illustrates a graphical user interface in an exemplary embodiment.

DETAILED DESCRIPTION

Figure 1:
FIG. 1 is a block diagram that illustrates a communication system.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Conventions

The article 'a' is not meant to limit the present system to the example given but rather allows a plurality of alternatives.

The term "including" introduces one or more examples of its antecedent, and such examples are not exclusive or preclusive of additional examples; i.e., the term "including" as used herein is understood meaning "including without limitation."

The present disclosure proposes systems and methods that assess, summarize, and depict the security level and reputation of a website by generating a security level score for the website. The assessment of the website includes analyzing a plurality of factors associated with the operation of the website. These factors may include the current state, safety level, and functionality of the website, external and historical information of the website, the likelihood that the website is unsafe or harmful based on trends related to the type of website, and current business practices for maintaining the website and related infrastructure.

By analyzing a website and generating a security level score, interested parties may be informed of the security aspects of the website. For example and without limitation, anyone who wishes to access the website, link to the website from another website, conduct business with the website owner, insure the owner of the website against liability, or evaluate the entity that manages the website may be informed of the current, historical, and expected safety and security of the website based on the analysis and scoring techniques described herein.

In one exemplary embodiment the system can be used as an advisory system. Examples of when a user of the system might receive such advisory information include without limitation:

(a) prior to the user visiting the website, and a consultation with the user could be explicitly performed by the user or automatically through a software agent executing on the user's device, which queries the system automatically;

(b) prior to the user conducting business with the website, including online banking, e-commerce purchase of goods and/or services, completing an application form, or providing personal information; and (c) prior to the user establishing a business transaction or transactions with the website, including relying on the website for automated electronic transactions, using the website as a e-commerce partner, using the website as a portal, or honoring electronic transactions conducted at the website.

The system can simply provide advisory information or be more "intrusive" including warning the user to not interact with a particular website and even prohibiting the user from accessing and interacting with that website.

Referring now to FIG. 1, an exemplary system architecture is shown in communication system 100. Communication system 100 includes site analysis system 110, communication network 120, and web server 130. Site analysis system 110 and communication network 120 communicate over communication link 121. Likewise, communication network 120 and web server 130 are in communication over communication link 131.

Site analysis system 110 comprises a computer system and communication transceiver. Site analysis system 110 may also include other components such as a router, server, data storage system, and power supply. Site analysis system 110 may reside in a single device or may be distributed across multiple devices. Site analysis system 110 may be a discrete system or may be integrated within other systems—including other systems within communication system 100. Site analysis system 110 could comprise a network switch, router, switching system, packet gateway, network gateway system, Internet access node, network server, database system, service node, firewall, or some other communication system—including combinations thereof. In some examples, site analysis system 110 could operate as a standalone system outside the infrastructure and firewall of web server 130, or could operate entirely within the infrastructure of web server 130, in which case communication network 120 could comprise a simple, direct communication link or bus between site analysis system 110 and web server 130. In other examples, site analysis system 110 could comprise components both within web server 130 and external to web server 130.

Furthermore, site analysis system 110 can be implemented and deployed in a variety of ways that would be apparent to someone skilled in the art, including the embodiments listed below. In one embodiment, site analysis system 110 could operate as a stand-alone and self-contained system (i.e., a centralized implementation). In another embodiment, site analysis system 110 may be implemented across several different devices in a distributed way (i.e., a distributed system). In yet another embodiment, site analysis system 110 could consist of a central device(s) or server(s) and light-weight client agents that are deployed on the devices of users, including personal computers, laptops, smartphones, portable devices, and tablets (i.e., client-server operation). In another embodiment, site analysis system 110 could comprise a stand-alone advisory system that is queried through a specified interface, while in another embodiment, site analysis system 110 may be integrated within a larger security or advisory system.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to several computer systems across a large geographic region.

Web server 130 comprises a processing system and communication transceiver. Web server 130 may also include other components such as a router, server, data storage system, and power supply. Web server 130 may reside in a single device or may be distributed across multiple devices. Web server 130 may be a discrete system or may be integrated within other systems—including other systems within communication system 100. Web server 130 hosts at least a portion of a website. In some examples, web server 130 could comprise a network switch, router, switching system, packet gateway, network gateway system, Internet access node, application server, database system, service node, firewall, or some other communication system—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 could be direct links or may include intermediate networks, systems, or devices.

Figure 2:
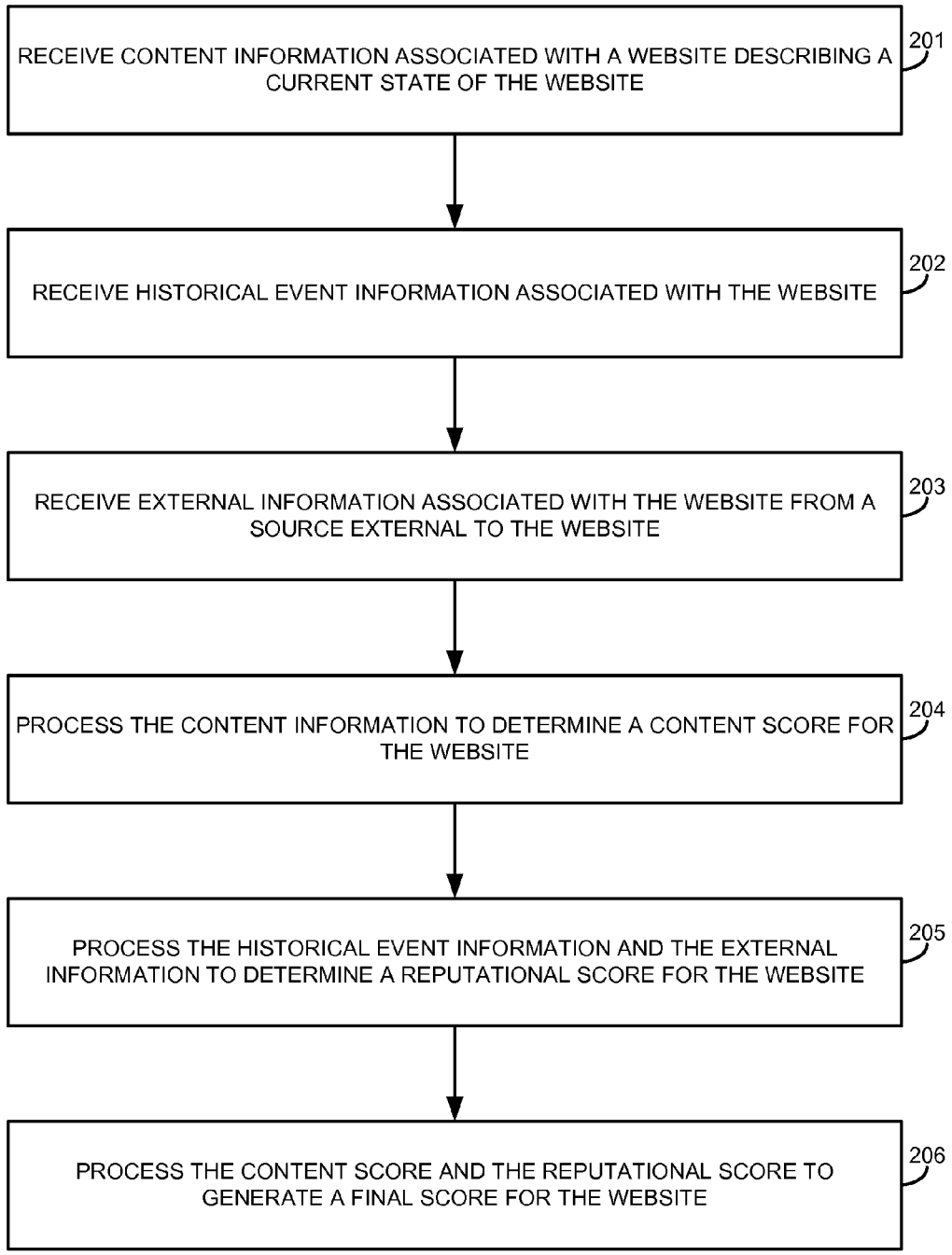
FIG. 2 is a flow diagram that illustrates an operation of the communication system.

FIG. 2 is a flow diagram that illustrates an operation of communication system 100. The steps of the operation are indicated below parenthetically. Initially, site analysis system 110 receives content information associated with a website describing a current state of the website (201). Typically, site analysis system 110 receives the content information from web server 130 that hosts the website, but site analysis system 110 could receive the content information from a database, server, local disk, or some other communication system (not shown). The content information could comprise a variety of factors and attributes associated with the content accessible at the website. For example, the content information could include network characteristics of web server 130, such as round trip delay, available bandwidth, and internet protocol (IP)-level characteristics, such as IP space and identification of a domain name system (DNS) resolver that translates the website domain name into an IP address. The content information could also include the textual content of the website that is stored in web server 130, including keywords, word count, metadata, and semantic meanings of text appearing in the website. The content information could also include the actual website code, including the format of the code, programming languages utilized, such as hypertext markup language (HTML), PHP, Perl, and JavaScript, known weaknesses and exploitabilities of each of the languages, and the programming style. In some examples, the programming style could be further analyzed to determine any deviations from best coding practices and specifications. The content information could also comprise characteristics of any kind of software associated with the website.

In addition to the website code, the content information could also include all content and web objects of the website, including shockwave files, flash animation, images, executables, audio, video, portable document format (PDF) files, and the like. The content information could also include content provided by third-party entities, such as advertisements appearing on the website that are controlled and hosted by a separate web server other than web server 130. In some examples, the content information could comprise characteristics of a server that hosts the website, such as web server 130. Such server characteristics could include the type of hardware and software of web server 130, such as a motherboard, processor, storage devices, operating systems, firewalls, and other software and equipment associated with web server 130 that hosts the website. Further, the content information could include these same types of server characteristics for other servers that supply third-party content appearing on the website, such as servers that provide advertisements for display on the website.

Additional data that may be included in the content information could comprise characteristics of the infrastructure of the business or individual that owns and operates the website, geographical characteristics of the website, and various security characteristics of the website, including security certificate analysis, security holes which are or have been present in the website, vulnerabilities identified by penetration testing tools, and other security issues. In some examples, the content information could include characteristics of any products, services, and/or information that is sold, transferred, or available via the website. Additionally, the content information could comprise associations of other pages and websites that link to or are linked from the website to form a map of interconnected pages between the other websites and the website being analyzed. In some examples, the content information could also include information about various mechanisms that a user may utilize to interact with the website, such as web forms, Completely Automated Public Turing tests to tell Computers and Humans Apart (CAPTCHAs), rate limiting policies, different language versions of the website, and others. The above represents only a small sampling of the type of data that may be included in the content information, and one of skill in the art will understand that additional data and metrics may be included in the content information for the website.

Site analysis system 110 also receives historical event information associated with the website (202). The historical event information could be received from web server 130 and/or other communication systems external to web server 130. The historical event information comprises past behavior and historical information associated with the web site. In some examples, the historical event information could comprise frequency of content changes of the website, frequency of security attacks on the website by malicious entities, and frequency of changes to a hosting infrastructure of the website, such as changes affecting the computer and network infrastructure that supports the site. The historical event information could also include the reputation of a professional webhosting company that hosts the website, such as web server 130. Additionally or alternatively, the historical event information could include the historical presence of the website in blacklists, including the specific IPs and web hosting providers, such as web server 130, associated with problems that led to the blacklisting. Other data and historical metrics could be included in the historical event information; the above merely provides examples of the type of data that may be included in the historical event information.

Site analysis system 110 further receives external information associated with the website from a source external to the website (203). Typically, site analysis system 130 would receive the external information from communication systems, servers, and databases that are not associated with web server 130. In some examples, the external information could comprise blacklists for the domain name and/or the IP of the website, including metrics associated with the blacklisting, such as duration of time spent on the blacklist, frequency of blacklisting, and the reasons for blacklisting. The external information could also include a reputational ranking of the website by search engines, indexing services, and other web servers. In some examples, the external information could include a community ranking of the website, such as collective opinions about the reputation of the website gleaned from individual posts, votes, and/or other interactions with the public on weblogs, online forums and the like. In addition, the external information could comprise community-driven efforts such as the Web of Trust and other website reputation rating tools where members of the community rank individual websites according to their user experience and other factors. Of course, additional external information is also possible and within the scope of the present disclosure.

Site analysis system 110 processes the content information to determine a content score for the website (204). The content score reflects the current security state and safety level of the website, and may indicate a level of ease or difficulty that the website could be compromised by malicious individuals, software applications, or other attacks. In some examples, to process the content information to determine the content score, site analysis system 110 could process the data in a hierarchical arrangement and apply a mathematical framework using both weighted functions and by continuously adapting weights to each item of information included in the content information. The adaptable weights for each of the data items could be predetermined or initially set by a user, and then dynamically modified based on changes in the underlying content information and other factors, such as the relative weights of each of the other data items in the content information. In some examples, a numerical scoring system could be used that considers the respective weights of each of the data items in the content information. The scores for each of the data items could then be compared to baseline or threshold values for each respective item to determine the extent to which a particular data item will influence the content score.

Site analysis system 110 also processes the historical information and the external information to determine a reputational score for the website (205). The reputational score reflects the external and historical information of the website across one or more dimensions including safety, privacy, trustworthiness, reliability, business ethics, customer feedback, infrastructure reputation, historical security events, and others. In some examples, site analysis system 110 could assess a trustworthiness of the external information based on a reputation of the source of the external information. In such examples, site analysis system 110 could include the trustworthiness of the external information as a factor when determining the reputational score for the website. For example, site analysis system 110 could apply adaptable weights to each data item of the external information based on their individual trustworthiness levels, and then dynamically modify the weights based on updated trustworthiness determinations. The weights for each of the data items in the external information could then be compared to threshold values for each respective item to determine the extent to which a particular data item will influence the reputational score. The historical information could then be assessed as well and combined with the external information to determine the overall reputational score for the website.

Site analysis system 110 then processes the content score and the reputational score to generate a final score for the website (206). Typically, site analysis system 110 generates the final score for the website by combining the content score and the reputational score using a rigorous mathematical approach. Further, this approach is customizable and may be slowly trained and fine-tuned over time via a machine learning process based on input and feedback from the operator of the system to produce the appropriate evaluation of the website. There are several techniques that site analysis system 110 could utilize to generate the final score, and one or more could be used depending on the desired output, whether it be a descriptive summary, identification of a weak link, or some other report. In one example, site analysis system 110 could calculate a weighted sum of the content score and the reputational score to generate the final score for the web site. In another example, site analysis system 110 could utilize threshold values for each of the content and reputational scores to determine the final score, where a score that meets or exceeds its threshold value is considered a "good" or positive score, while a score that falls below its threshold value could indicate a problem which would then be reflected in the final score. Other techniques may also be utilized to summarize the results of the content score and the reputational score to generate the final score. In some examples, the content score, reputational score, and/or the final score could take the form of a numerical value, an alphanumeric set of characters and symbols such as a letter grade, visual/audible indications such as colors and sounds, graphical depictions such as plots and charts, or some other metrics—including combinations thereof.

Advantageously, site analysis system 110 processes content information to determine a content score and processes historical event information and external information to determine a reputational score for the website. By then processing the content score and the reputational score, an overall final score for the website can be generated that reflects both the content and reputation of the website with respect to the safety and security of the site. In this manner, reports and other statistical metrics associated with site security may be generated and presented to interested parties. The presentation of results can be fully customized to meet the requirements of each individual user, just as the particular information items used to generate each score may be included, excluded, or weighted by the user for a fully parameterized and fine-tuned assessment of a website. An exemplary embodiment involving such user customization will now be discussed with respect to FIGS. 3, 4, and 5.

Figure 3:
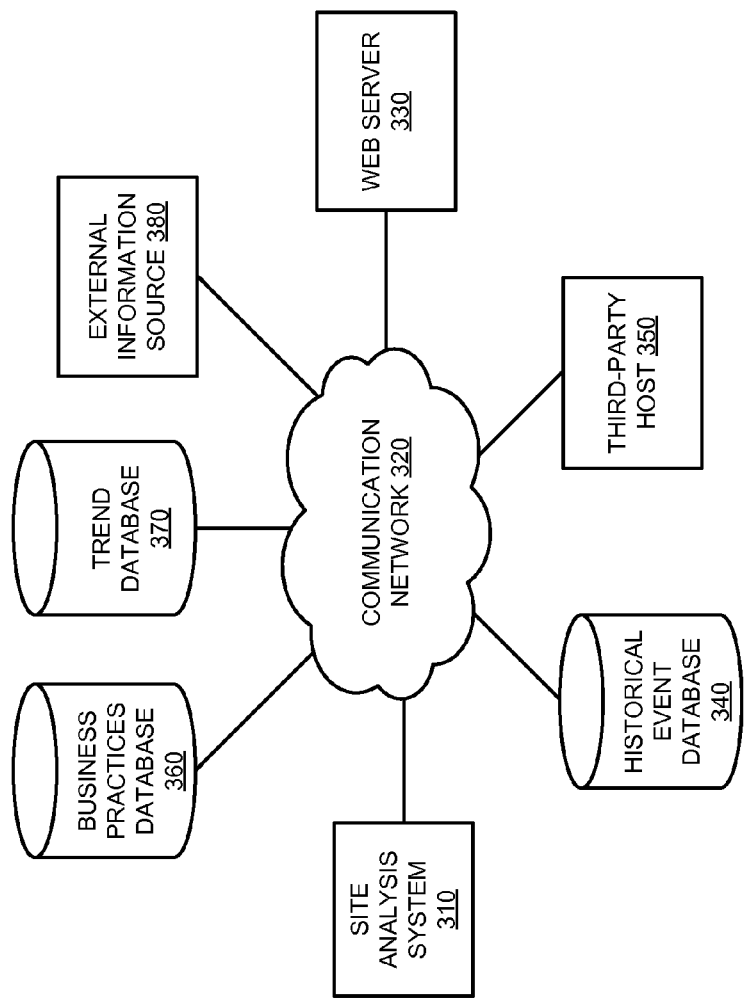
FIG. 3 is a block diagram that illustrates a communication system in an exemplary embodiment.

FIG. 3 is a block diagram that illustrates communication system 300 in an exemplary embodiment. Communication system 300 includes site analysis system 310, communication network 320, web server 330, historical event database 340, third-party host 350, business practices database 360, trend database 370, and external information source 380. Elements 330-380 are in communication with site analysis system 310 via communication network 320.

Web server 330 comprises the primary web host for a website to be analyzed, whereas third-party host 350 might host additional content that appears and/or is linked on the website, such as advertisements, external hyperlinks, and other content not hosted by the primary web server 330. Historical event database 340 stores historical event information associated with the website. Business practices database 360 stores information associated with the current business practices of the website operator, and includes the policies and practices used to maintain the website and related infrastructure. Trend database 370 stores information related to trends over different types or categories of websites, such that similar trends may be expected to occur for similar types of websites. Finally, external information source 380 supplies information associated with the website that is external to the website being analyzed, which could comprise publically-available and/or third-party metrics, opinions, test results, and other data associated with the website. One of skill in the art will understand that the system and network architecture shown in the exemplary embodiment of communication system 300 is just one of many possible examples of how site analysis system 310 could receive the various items of information necessary to analyze a website.

FIG. 4 is a block diagram that illustrates graphical user interface 401 in an exemplary embodiment. Graphical user interface 401 provides one example of a user-customizable security level determination tool that may be used to provide input for various options associated with security analysis for a website. The user-customizable security level determination tool shown in graphical user interface 401 could be presented to the user via a web browser, such as a website where the user may provide selections for the security analysis using form entry boxes, dropdown menus, and the like. Alternatively, the user could provide the input via a standalone application executed on a computer system or some other device capable of displaying various options and receiving input selections from the user. In order to select the website to be analyzed, the user could provide the website directly by typing a uniform resource locator (URL) of the website, by clicking or hovering a mouse cursor over a hyperlink appearing on another website being viewed by the user, based on the URL of the website currently being viewed by the user, by examining embedded hyperlinks in a website being viewed by the user, or some other manner of indicating a website to site analysis system 310.

Once the website is identified to the system, the user can customize and fine-tune the analysis of the website by providing additional parameters pertaining to the desired level of detail, the number of modules, the number and type of sources of information or tools for use in the analysis, and the desired format for the output results. Such a user-customizable security level determination tool is shown as a table on graphical user interface 401. The table includes columns labeled "Module", "Attribute", "Include in Analysis?", and "Weight". Each module includes various attributes and parameters associated therewith that the user may choose to include or exclude from the security analysis of the site. One of skill in the art will understand that the various attributes and configuration options appearing on graphical user interface 401 are merely exemplary in nature, and that greater or fewer attributes for each module and greater or fewer columns of information and selections may be presented to the user in other examples.

As shown in the "Module" column, the user-customizable security level determination tool shown in graphical user interface 401 includes a content analysis module, a reputational analysis module, a predictive module, and a business practices module. The user may choose to include one or more of these modules in the analysis of a website. The operation of these modules is discussed below with respect to FIG. 5. The "Attribute" column provides a more detailed view of the various characteristics associated with each of the modules. The user may select whether or not individual attributes are included in the analysis, and can apply a weight to each of the attributes that will be used by site analysis system 310 to determine the security level score for the analyzed website, which in this example is on a scale of 1 to 10, although the weights for each attribute could be provided using alternative scales or systems in other examples.

In this example, the user has entered selections for the various modules on graphical user interface 401. For the content analysis module, the user has included all of the attributes of this module in the analysis, and has assigned a weight of "5" to the "server characteristics" attribute, a weight of "4" to the "program languages" attribute, and a weight of "6" to the "service site provides" attribute Likewise, the user has selected all of the attributes shown for the reputational analysis module, and has assigned weights of "9" to both the "security attacks" and "blacklists" attributes, a weight of "7" to the "reputational rank" attribute, and a weight of "6" to the "historical changes" attribute. For the predictive module, the "trends for similar site types" attribute has been given a weight of "7", while the "customer profile" and "traffic profile" attributes have each been assigned a weight of "6". Finally, with respect to the business practices module, the user has chosen not to include the "server maintenance" attribute, but has included the "code maintenance" attribute and assigned a weight of "3" thereto. In this manner, the site analysis may be fully customized, and these attributes and respective weightings are also adaptive and can evolve using machine learning algorithms and user feedback over a period of time to continuously improve on the effectiveness and accuracy of the system.

Figure 5:
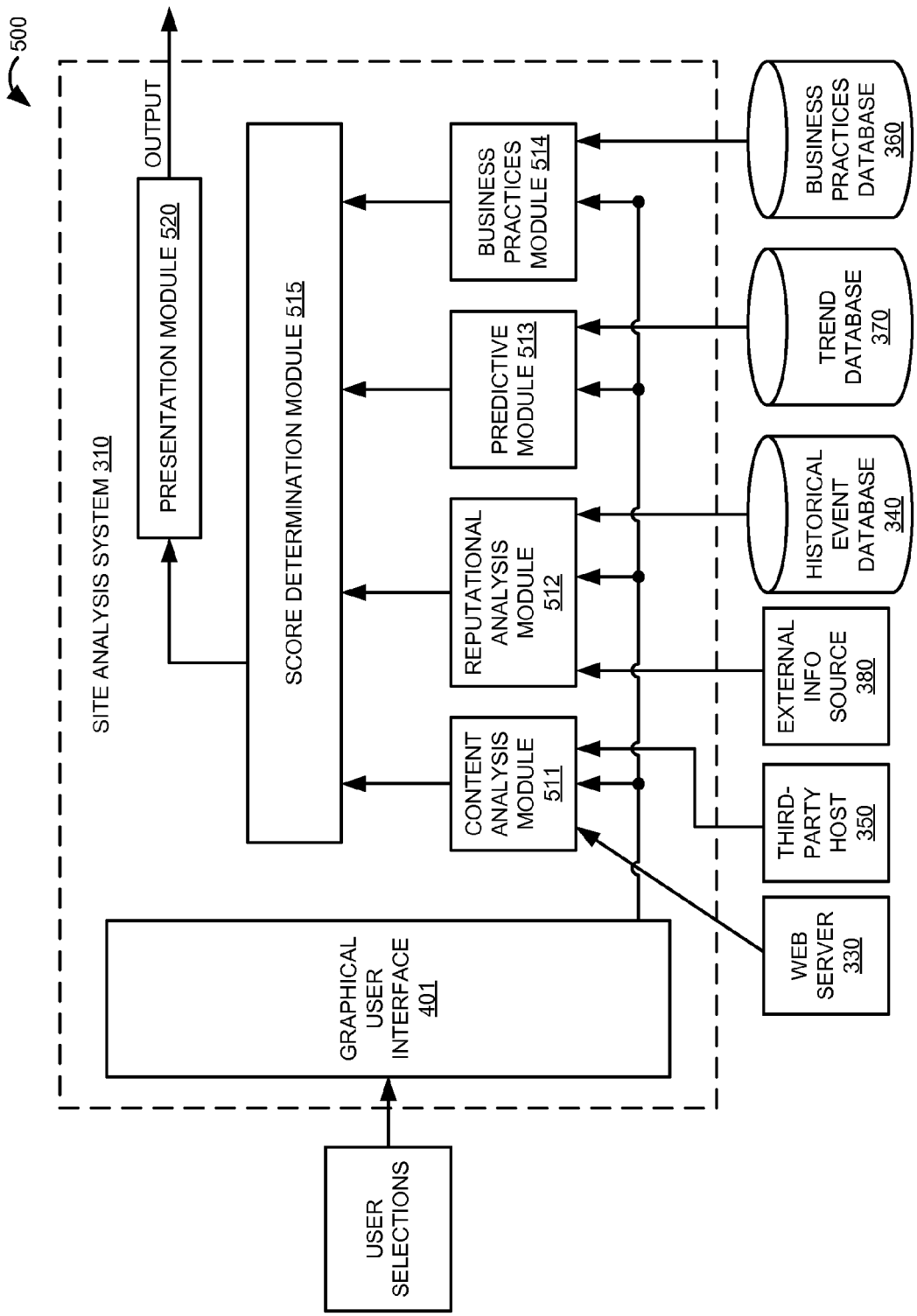
FIG. 5 is a block diagram that illustrates an operation of a communication system in an exemplary embodiment.

FIG. 5 is a block diagram that illustrates an operation of communication system 300 in an exemplary embodiment. In particular, the user selections shown in FIG. 4 are provided as input to graphical user interface 401 of site analysis system 310. Site analysis system 310 is also shown as comprising content analysis module 511, reputational analysis module 512, predictive module 513, business practices module 514, score determination module 515, and presentation module 520 in this example. Site analysis system 310 provides an example of site analysis system 110, although system 110 could use alternative configurations.

In this example, after the user selections are input into site analysis system 310 via graphical user interface 401 (which could be performed remotely by the user via a web browser), the various attributes and weights are provided to their respective modules 511-514 for processing.

Content analysis module 511 receives the user selections along with content information from web server 330 and third-party host 350. Content analysis module 511 processes this information to determine the current security state and safety level of the website. In doing so, content analysis module 511 may execute a variety of software-based tools to collect and analyze the information, including tools that detect network infrastructure vulnerabilities, penetration testing tools, structured query language (SQL) injection tools, malware/virus detection tools that can identify malicious code present on a website, and other software applications. In this example, a weight of "5" has been assigned to the "server characteristics" attribute, which could include the type of hardware and software used by web server 330 and/or third-party host 350, such as a type of web server software utilized, software version/update status, an operating system executing on the server 330, and other characteristics of the servers that host the website. The "program languages" attribute has been given a lower weight of "4", and this attribute could include the code that comprises the website, including the format, the language, the programming style, the weaknesses of each type of programming language used in the code, an identification of any deviation from standard coding practices and specifications, and other characteristics of the programming languages used to create the website. Finally, the "service site provides" attribute is weighted "6", and could include characteristics of the infrastructure of the business which owns and operates the website, characteristics of any products, services, and information that are sold, offered, or available at the website, and other characteristics of the services offered by the website. Content analysis module 511 compiles all of this information and applies a mathematical framework to produce a content score, factoring in the respective weights of each item of information. The output of the content analysis module 511 is passed to the score determination module 515.

Reputational analysis module 512 receives the user input and responsively retrieves external information from external information source 380 and historical event information from historical event database 340. As shown in FIG. 4, the user has weighted the attributes for the reputational analysis module relatively higher than the other modules. In particular, the "security attacks" and "blacklists" attributes have been assigned weights of "9", the "reputational rank" attribute a weight of "7", and the "historical changes" attribute is weighted "6". Reputational analysis module 512 thus processes this information and applies the respective weights to each data item to determine a reputational score for the website. In some examples, reputational analysis module 512 could use adaptive machine learning and feedback mechanisms from the operator or a training set in order to intelligently assess the trustworthiness of the external information source 380, and could then factor in this trustworthiness component into the reputational score determination. The reputational score is then output and provided to score determination module 515.

Predictive module 513 estimates the likelihood that the website will become harmful, unsafe, or insecure in the future. Typically, predictive module 513 could perform this estimation using predictive analytics based on trends associated with the type of website being analyzed along with the results from the content analysis module 511 and the reputational analysis module 512. In some examples, predictive module 513 utilizes mathematical tools for prediction and estimation, such as maximum likelihood, Bayesian theory, neural networks, machine learning techniques, and other methods. Some exemplary factors that may be considered by predictive module 513 could include trends of events on similar types of websites, profiles of customer base, role, and traffic associated with the website, characteristics of the staff or companies managing the website or parts of its functions and infrastructure, whether or not an active website protection service is utilized, and other information pertaining to the website. Predictive module 513 typically receives trend information pertaining to events on similar types of website from trend database 370.

In some examples, to determine the type of the website being analyzed, predictive module 513 could process the content information and/or the content score produced by content analysis module 511 to determine a type of the website, receive trend information for websites of a same type as the type of the website, and process the trend information to predict a future security level for the website. Predictive module 513 could then apply the weight of "7" to this trend determination as directed by the user selections for the "trends for similar site types" attribute Likewise, predictive module 513 determines a customer profile and traffic profile of the website and applies weights of "6" to each as provided in the user selections shown in FIG. 4. These various weighted attributes are then combined based on a weighted sum model which is derived from analyzing the effect of various weights on the accuracy of predicting the vulnerability and/or the malicious nature of websites. The weighted sum model could be based on predictive Markov models and regression-based mathematical modeling to probabilistically predict the appropriate weights to use when combining all of the attributes in order to provide an accurate result. Predictive module 513 thereby produces a future security score representing a prediction of a future security level for the website. The future security level prediction is then sent to the score determination module 515.

Business practices module 514 receives information from business practices database 360 relating to the current business practices and policies for maintaining the website and the related infrastructure. Business practices module 514 applies a mathematical framework to transform policies and practices into a numerical value to represent the effectiveness of the management of the website. For example, business practices module 514 could consider whether a periodic scan of the site for malware and other problems is conducted, along with a frequency and rigorousness of such a scan, whether there is a schedule in effect for updating and patching the hosting infrastructure of the web site, thoroughness of the quality assurance testing of the website code, and other business practices and policies associated with the website. In this example, the user has chosen to only include the code maintenance practices of the website operator, and has assigned this attribute a relatively low weight of "3". As shown in FIG. 4, the user has excluded the server maintenance considerations from the analysis of this website. Thus, after receiving business practices information associated with the website describing current business practices for maintaining the website, business practices module 514 processes the business practices information to determine a business practices score, factoring in any weights assigned to the information by the user or the system. The business practices score is then passed to the score determination module 515 for processing.

Score determination module 515 combines the outputs from modules 511-514 by using a rigorous mathematical approach. Over time, the combinational functions utilized by score determination module 515 may be fine-tuned by learning based on feedback received from the operator of the system, training sets, and other factors. Score determination module 515 processes the scores received from modules 511-514 and generates a final score for the website. In some examples, the final score for the website could comprise multiple numerical values and metrics in order to provide detailed reports concerning the security level of the website. The final score could comprise the score from each module 511-514, scores of combinations of one or more of the modules 511-514, and the scores from all of the modules 511-514 combined. For example, score determination module 515 could process the content score, the reputational score, the future security level, and/or the business practices score—both separately and individually—to determine the final score for the website, which could include various combinations thereof. The behavior of the score determination module 515 can be user-defined and customized in a similar manner as the customization techniques for modules 511-514 as shown in FIG. 4.

There are several techniques that score determination module 515 could utilize to generate the final score, and one or more could be used depending on the desired output, whether it be a descriptive summary, identification of a weak link, or some other report. In one example, score determination module 515 could calculate a weighted sum of the content score, the reputational score, the future security level, and the business practices score to generate the final score for the web site. In another example, score determination module 515 could utilize threshold values for each of the input scores to determine the final score, where a score that meets or exceeds its threshold value is considered a "good" or positive score, while a score that falls below its threshold value could indicate a problem which would then be reflected in the final score. Other techniques may also be utilized to summarize the results of the modules 511-514 to generate the final score.

The final score and then provided to the presentation module 520. Presentation module 520 is responsible for organizing and presenting the information at the appropriate level of detail, which may be specified by a client or user of site analysis system 310. In some examples, presentation module 520 considers the preferences of the recipient of the information, the authorized level of detail for the recipient, and other factors. The recipient of the information could comprise another computer system or software application in some examples. Presentation module 520 is capable of formatting the final score and other results in a variety of ways, including numerical values, letters, symbols, strings, sounds, and graphics, such as colors, plots, and charts.

In addition, presentation module 520 associates the evaluation of the data with various indicators that reflect the depth, availability, specific parameters, and techniques used to produce the final score. For example, an indicator could identify that the final score is not based on historical event information if the website is new or under development and no historical information exists for the website. In some examples, the final score could also include suggestions as to actions that may be taken by the website operator in order to improve the final score. Presentation module 520 is thus able to provide an array of scores and other information that may be used by a recipient to evaluate the safety and security of the website, with varying levels of detail in the report.

For example, the information regarding the security level of one or more websites could appear in several different forms, specified by the user or set by the operator of the system, which include but are not limited to:
(a) a list of websites with their associated scores;
(b) an interactive answer to a query provided by a user for one or more websites;
(c) a time plot that shows the evolution of the security level of the website(s) over a user-specified time interval; and
(d) a comparative chart that shows the website(s) of interest and how they compare to each other, along with reference levels of security as specified by industry standards, or representative security levels of a relevant peer set of websites (including the average or median) that are used as reference.

Figure 6:
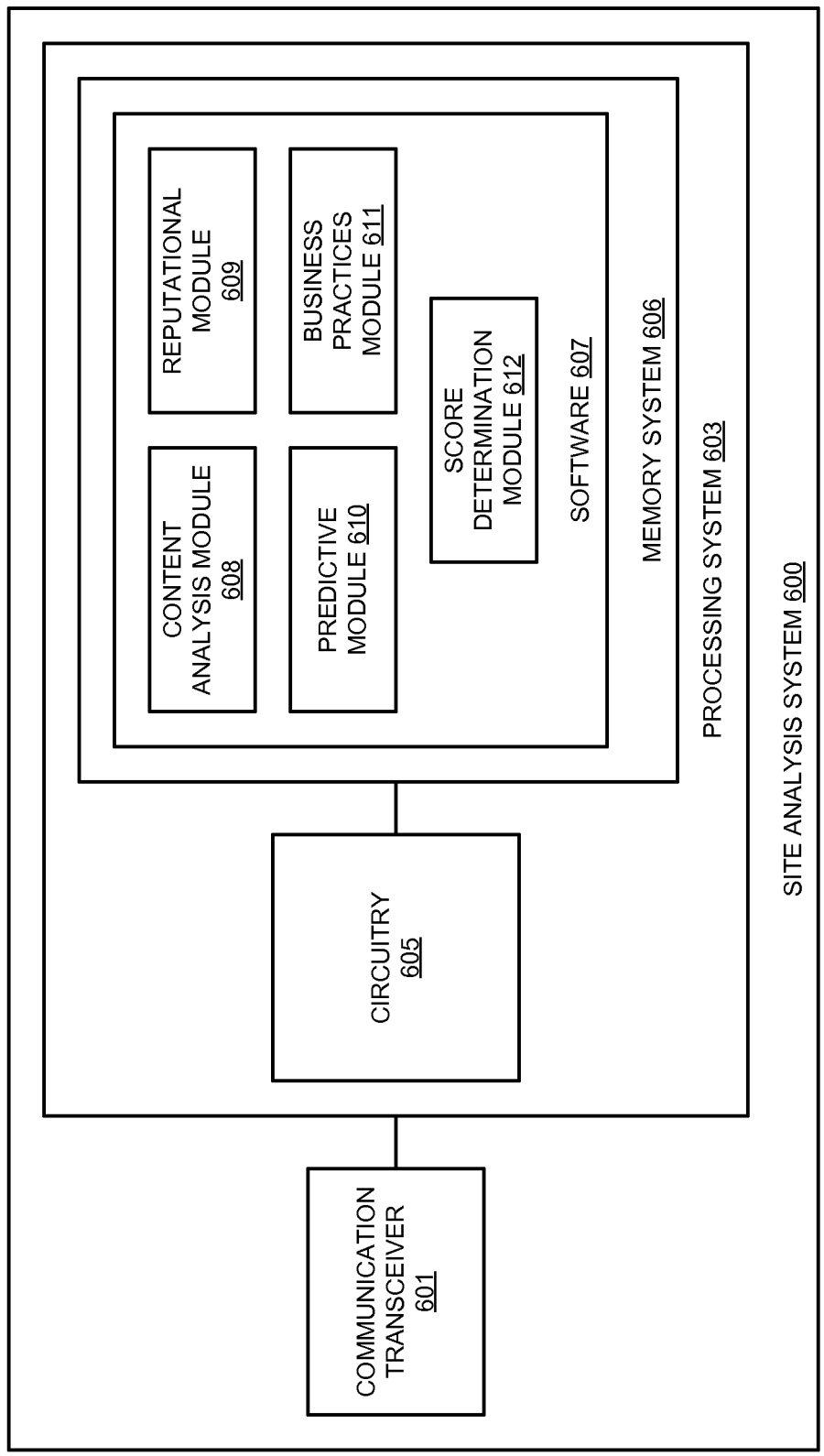
FIG. 6 is a block diagram that illustrates a site analysis system.

FIG. 6 is a block diagram that illustrates site analysis system 600. Site analysis system 600 provides an example of site analysis systems 110 and 310, although systems 110 and 310 may use alternative configurations. Site analysis system 600 comprises communication transceiver 601 and processing system 603. Processing system 603 is linked to communication transceiver 601. Processing system 603 includes processing circuitry 605 and memory system 606 that stores operating software 607. Operating software 607 comprises software modules 608-612.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof. Communication transceiver 601 may be configured to receive content information associated with a website describing a current state of the website, receive historical event information associated with the website, and receive external information associated with the website from a source external to the website.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-612, although software 607 could have alternative configurations in other examples.

When executed by circuitry 605, operating software 607 directs processing system 603 to operate as described herein for site analysis systems 110 and 310. In particular, operating software 607 directs processing system 603 to direct communication transceiver 601 to receive content information associated with a website describing a current state of the website, receive historical event information associated with the website, and receive external information associated with the website from a source external to the website. Further, operating software 607 directs processing system 603 to process the content information to determine a content score for the website. Operating software 607 also directs processing system 603 to process the historical event information and the external information to determine a reputational score for the website. Finally, operating software 607 directs processing system 603 to process the content score and the reputational score to generate a final score for the website.

In this example, operating software 607 comprises a content analysis software module 608 that receives content information associated with a website describing a current state of the website and processes the content information to determine a content score for the website. In addition, operating software 607 comprises a reputational analysis software module 609 that receives historical event information associated with the website, receives external information associated with the website from a source external to the website, and processes the historical event information and the external information to determine a reputational score for the website. Further, operating software 607 comprises a score determination software module 612 that processes the content score and the reputational score to generate a final score for the website.

In some examples, operating software 607 could further comprise a predictive software module 610 that processes the content information to determine a type of the website, receives trend information for websites of a same type as the type of the website, and processes the trend information to predict a future security level for the website. Likewise, operating software 607 could comprise a business practices software module 611 that receives business practices information associated with the website describing current business practices for maintaining the website and processes the business practices information to determine a business practices score in some examples. In such cases, the score determination software module 612 could be further configured to process the content score, the reputational score, and the future security level to generate the final score for the website, process the content score, the reputational score, and the business practices score to generate the final score for the website, and/or process the content score, the reputational score, the future security level, and the business practices score to generate the final score for the website.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a site analysis system to determine a security level of a website, the method comprising:
receiving content information associated with the website describing a current state of the website, wherein the content information comprises programming languages used in code of the website and a programming style of the code;
receiving historical event information associated with the website, wherein the historical event information comprises a frequency of content changes of the website;

receiving external information associated with the website from a source external to the website, wherein the external information comprises a community ranking of the website;

processing the content information to determine a content score for the website, wherein processing the content information to determine the content score comprises identifying exploitabilities of the programming languages used in the code of the website and analyzing the programming style of the code to determine an extent to which the programming style deviates from best coding practices;

processing the historical event information and the external information to determine a reputational score for the website, wherein processing the historical event information and the external information to determine the reputational score comprises assessing a trustworthiness of the external information based on a reputation of the source of the external information and applying adaptable weights to the external information based on the trustworthiness; and processing the content score and the reputational score to generate a final score for the website.

2. The method of claim 1 further comprising:
processing the content information to determine a type of the website;
receiving trend information for websites of a same type as the type of the website; and
processing the trend information to predict a future security level for the website.

3. The method of claim 2 wherein processing the content score and the reputational score to generate the final score for the website comprises processing the content score, the reputational score, and the future security level to generate the final score for the website.

4. The method of claim 1
wherein processing the historical event information and the external information to determine the reputational score for the website includes processing the trustworthiness of the external information to determine the reputational score for the website.

5. The method of claim 1 further comprising:
receiving business practices information associated with the website describing current business practices for maintaining the website; and
processing the business practices information to determine a business practices score, wherein processing the content score and the reputational score to generate the final score for the website comprises processing the content score, the reputational score, and the business practices score to generate the final score for the website.

6. The method of claim 1 wherein the content information comprises characteristics of a server that hosts the website, advertisements appearing on the website, and characteristics of a service provided by the website.

7. The method of claim 1 wherein the historical event information comprises frequency of security attacks on the website by malicious entities and frequency of changes to a hosting infrastructure of the website.

8. The method of claim 1 wherein the external information comprises blacklists associated with the website and reputational ranking of the website by search engines.

9. A site analysis system to determine a security level of a website, the system comprising:
a communication transceiver configured to receive content information associated with the website describing a current state of the website, wherein the content information comprises programming languages used in code of the website and a programming style of the code, receive historical event information associated with the website, wherein the historical event information comprises a frequency of content changes of the website, and receive external information associated with the website from a source external to the website, wherein the external information comprises a community ranking of the website; and a processing system configured to process the content information to determine a content score for the website, wherein the processing system configured to process the content information to determine the content score comprises the processing system configured to identify exploitabilities of the programming languages used in the code of the website and analyze the programming style of the code to determine an extent to which the programming style deviates from best coding practices, process the historical event information and the external information to determine a reputational score for the website, wherein the processing system configured to process the historical event information and the external information to determine the reputational score comprises the processing system configured to assess a trustworthiness of the external information based on a reputation of the source of the external information and apply adaptable weights to the external information based on the trustworthiness, and process the content score and the reputational score to generate a final score for the website.

10. The system of claim 9 further comprising:
the processing system configured to process the content information to determine a type of the website;
the communication transceiver configured to receive trend information for websites of a same type as the type of the website; and
the processing system configured to process the trend information to predict a future security level for the website.

11. The system of claim 10 wherein the processing system configured to process the content score and the reputational score to generate the final score for the website comprises the processing system configured to process the content score, the reputational score, and the future security level to generate the final score for the website.

12. The system of claim 9
wherein the processing system configured to process the historical event information and the external information to determine the reputational score for the website includes the processing system configured to process the trustworthiness of the external information to determine the reputational score for the website.

13. The system of claim 9 further comprising:
the communication transceiver configured to receive business practices information associated with the website describing current business practices for maintaining the website; and
the processing system configured to process the business practices information to determine a business practices score, wherein the processing system configured to process the content score and the reputational score to generate the final score for the website comprises the processing system configured to process the content score, the reputational score, and the business practices score to generate the final score for the website.

14. The system of claim 9 wherein the content information comprises characteristics of a server that hosts the website, advertisements appearing on the website, and characteristics of a service provided by the website.

15. The system of claim 9 wherein the historical event information comprises frequency of security attacks on the website by malicious entities and frequency of changes to a hosting infrastructure of the website.

16. The system of claim 9 wherein the external information comprises blacklists associated with the website and reputational ranking of the website by search engines.

17. A non-transitory computer-readable medium having program instructions stored thereon for operating a site analysis system, the computer-readable medium comprising:
  a content analysis software module configured to direct the site analysis system to receive content information associated with the website describing a current state of the website and process the content information to determine a content score for the website, wherein the content information comprises programming languages used in code of the website and a programming style of the code and wherein the content analysis software module configured to direct the site analysis system to process the content information to determine the content score comprises the content analysis software module configured to direct the site analysis system to identify exploitabilities of the programming languages used in the code of the website and analyze the programming style of the code to determine an extent to which the programming style deviates from best coding practices;
  a reputational software module configured to direct the site analysis system to receive historical event information associated with the website, wherein the historical event information comprises a frequency of content changes of the website, receive external information associated with the website from a source external to the website, wherein the external information comprises a community ranking of the website, and process the historical event information and the external information to determine a reputational score for the website, wherein the reputational software module configured to direct the site analysis system to process the historical event information and the external information to determine the reputational score comprises the reputational software module configured to direct the site analysis system to assess a trustworthiness of the external information based on a reputation of the source of the external information and apply adaptable weights to the external information based on the trustworthiness; and
  a score determination software module configured to direct the site analysis system to process the content score and the reputational score to generate a final score for the website.

18. The non-transitory computer-readable medium of claim 17 further comprising:
  a predictive software module configured to direct the site analysis system to process the content information to determine a type of the website, receive trend information for websites of a same type as the type of the website, and process the trend information to predict a future security level for the website.

19. The non-transitory computer-readable medium of claim 18 wherein the score determination software module configured to direct the site analysis system to process the content score and the reputational score to generate the final score for the website comprises the score determination software module configured to direct the site analysis system to process the content score, the reputational score, and the future security level to generate the final score for the website.

20. The non-transitory computer-readable medium of claim 17 further comprising:
  a business practices software module configured to receive business practices information associated with the website describing current business practices for maintaining the website, and process the business practices information to determine a business practices score, wherein the score determination software module configured to direct the site analysis system to process the content score and the reputational score to generate the final score for the website comprises the score determination software module configured to direct the site analysis system to process the content score, the reputational score, and the business practices score to generate the final score for the website.

21. A method of operating a site analysis system to determine a security level of a website, the method comprising:
  identifying a current state of the website based on content information associated with the website, wherein the content information comprises programming languages used in code of the website and a programming style of the code;
  identifying historical events associated with the website, wherein the historical events comprise a frequency of content changes of the website;
  identifying external information associated with the website, wherein the external information comprises a community ranking of the website; and
  generating a score describing the security level of the website based on the current state, the historical events, and the external information, wherein generating the score comprises identifying exploitabilities of the programming languages used in the code of the website, analyzing the programming style of the code to determine an extent to which the programming style deviates from best coding practices, assessing a trustworthiness of the external information based on a reputation of a source of the external information, and applying adaptable weights to the external information based on the trustworthiness.

* * * * *